Dec. 3, 1935.   H. F. VICKERS   2,022,698
HYDRAULIC STEERING MECHANISM
Filed March 15, 1933   3 Sheets-Sheet 3
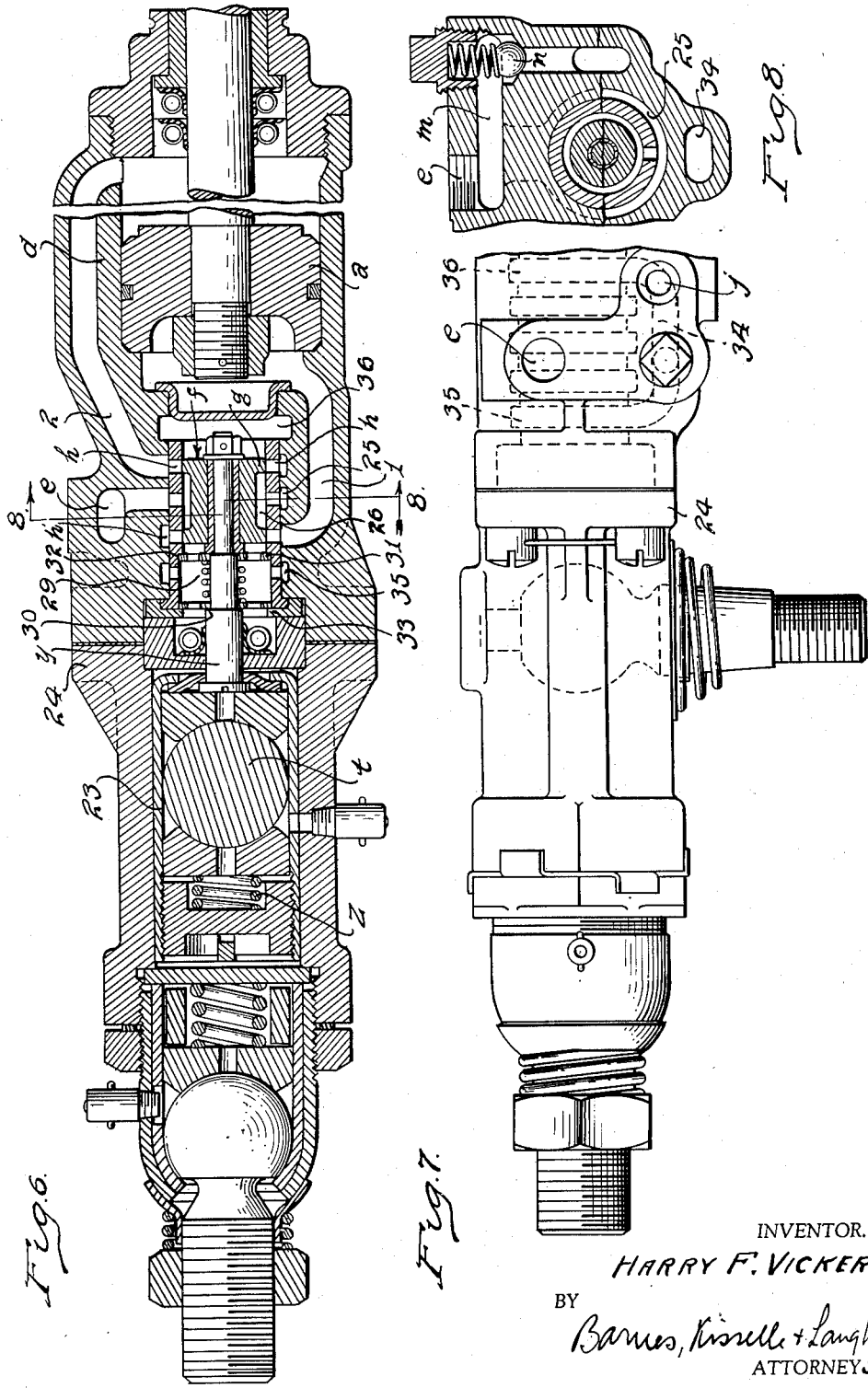
INVENTOR.
HARRY F. VICKERS.
BY
Barnes, Kisselle + Laughlin
ATTORNEYS Patented Dec. 3, 1935

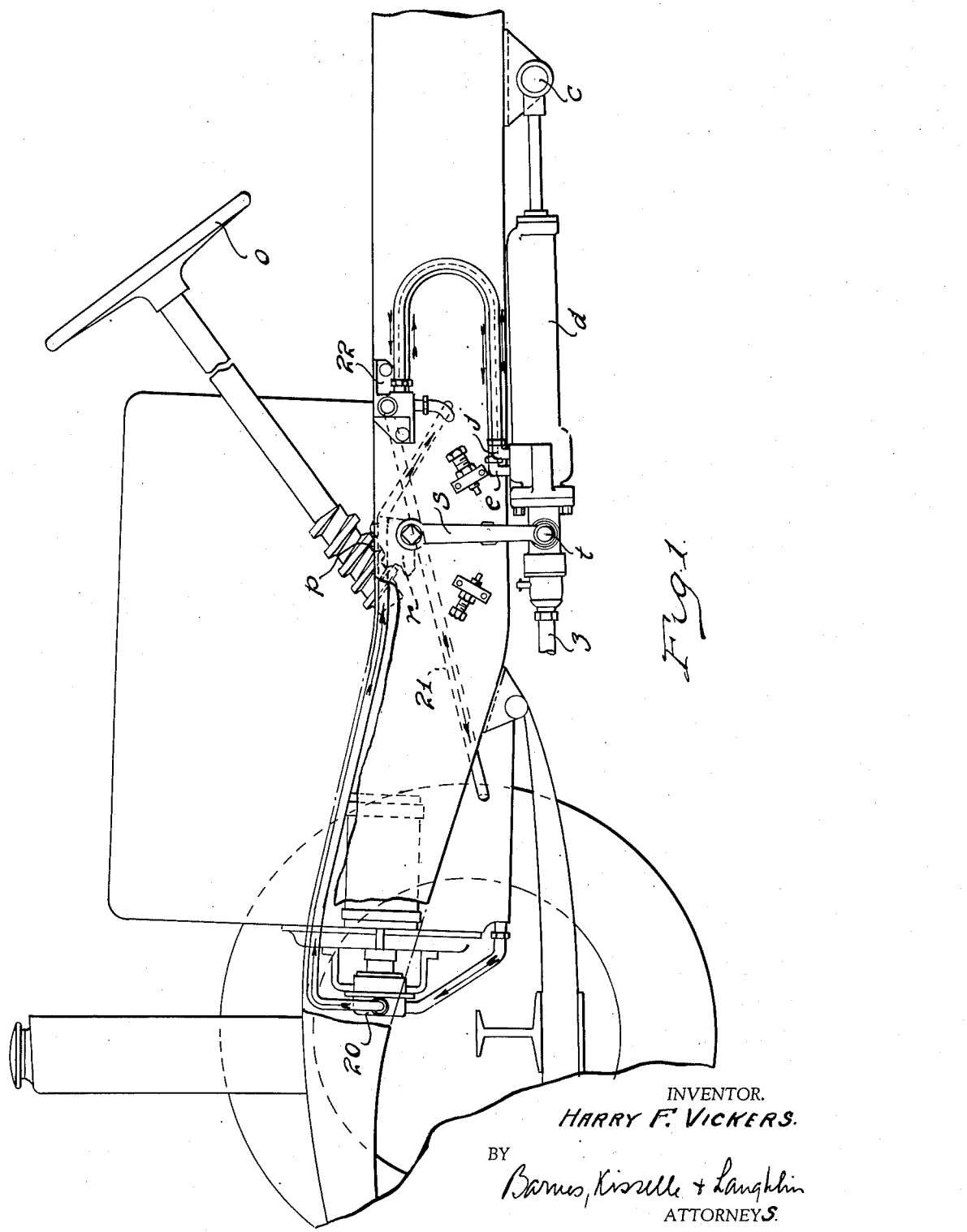

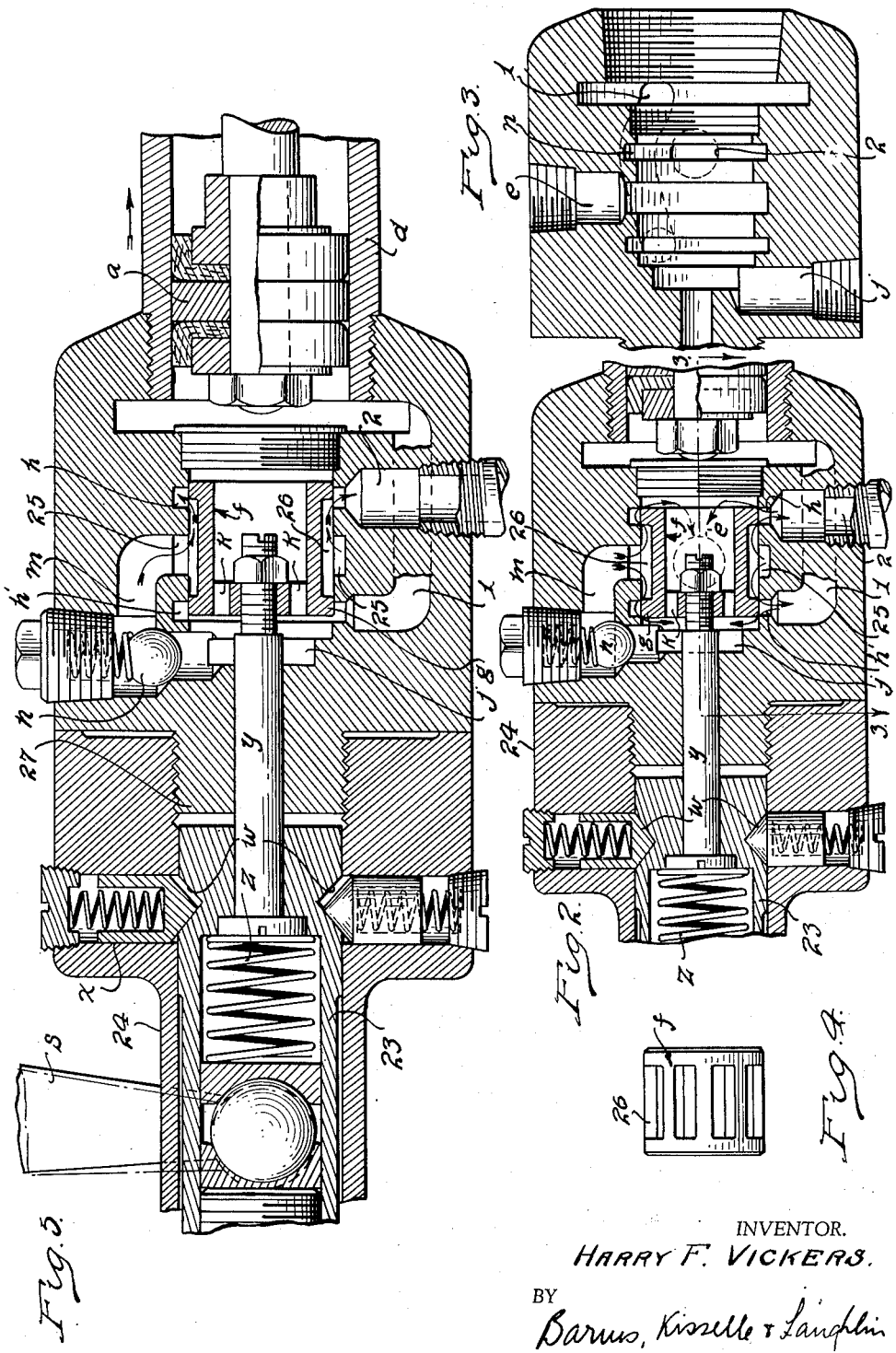

2,022,698

UNITED STATES PATENT OFFICE 2,022,698

HYDRAULIC STEERING MECHANISM

Harry F. Vickers, Detroit, Mich.

Application March 15, 1933, Serial No. 660,839

8 Claims. (Cl. 180—79.2)

This application is a continuation in part of my application Serial No. 400,712, filed October 18, 1929. The apparatus there shown is also here shown, together with an alternative form which, at the present time, I prefer.

This invention relates to a hydraulic servo apparatus especially hydraulic steering gear. In the prior art, it has been proposed to steer vehicles by hydraulic power apparatus and also by combined hand-operated and hydraulically operated apparatus. The hydraulic apparatus heretofore proposed has been open to the objection that it overthrew the steered wheels slightly. In steering gear of the worm gear type, especially with a long steering arm, there is a considerable play or lost motion due to the looseness between the teeth of the fear and the worm. This is sometimes called "back-lash". With a pivoted steering arm which is much longer on the load side of the pivot than on the power or actuating side, this lost motion is multiplied. It is therefore possible for the power operated "follow-up member", when the valve is displaced from neutral position, to drag the valve along with it, within the limits of the lost motion. That is to say, until this lost motion is taken up, there is nothing to stop the valve going along with the follow-up member (be it cylinder or piston) and thereby keeping the valve displaced from neutral position, although the driver has stopped the hand wheel. Consequently, the power continues to turn the wheels within the limits of the lost motion after the operator has tried to stop them. Of course, this necessitates a turning back of the hand wheel to correct the overthrow of the steering wheels.

It has also been proposed to combine hand and hydraulic power steering by interposing between the valve and the follow-up member, a relatively stiff spring which under ordinary conditions of steering will not compress but will mechanically communicate the steering effort directly from the valve to the follow-up member. Inasmuch as this hand operation tends to displace liquid, at one end of the piston, an arrangement must be made for the liquid to freely by-pass around the piston—usually through the piston. One way that this has been done has been to utilize ports around the valve which when the valve is in neutral position must have considerable opening. The springs between the valve and the follow-up member are not compressed except under abnormal resistance of the steered wheels. In fact, the springs are strong enough to cause the steering nut to move the steering screw by road shocks so as to communicate the alleged "feel" of the road to the steering wheel. The hand operation of the steering wheel is made harder than would ordinarily be the case because of the dashpot action of the liquid being by-passed from one side of the piston to the other. The power control of the apparatus is made somewhat arduous for one has to exercise more effort on the hand steering wheel than would ordinarily be necessary to do the steering in order to collapse the spring between the follow-up member and the valve in order to permit the shifting of the valve from neutral position and bring the hydraulic power into action. This apparatus referred to is reversible and may rapidly and repeatedly alternate between a hand and power operation as the steering load changes.

It is the purpose of my invention to have the advantages of power operation such as proposed in the prior art, but without the objectionable overthrow of the steering wheels due to back-lash and without the disadvantages or of overcoming strong resistance before application of power. My apparatus is entirely irreversible which permits the vehicle to be kept on its desired line of movement with practically no effort even though the steering would be almost impossible if it were manual as, for instance, when a tire has blown or collapsed.

This I accomplish by interposing between the valve and follow-up member spring resistance of quite a different character than that contemplated in the prior art. Instead of the spring member which is capable of communicating the manual steering effort mechanically and directly to the steered wheels under ordinary conditions and also in the reverse direction communicating road shocks to the steering nut or sector and moving the steering wheel, I utilize a spring which has no other function than simply to interpose enough resistance between the follow-up member and the valve so that the follow-up member will not drag the valve along by friction or the valve follow by inertia after the steering effort has ceased. Such a spring may be so designed as to interpose little resistance to valve control effort and, hence, the steering is done at all times (except in the emergency of failure of power) wholly by power and with much less effort than would be necessary for hand steering under the most ideal conditions and at the same time the steered wheels are given directional stability regardless of road shocks. The apparatus absorbs road shocks in a way that will not injure the apparatus. This will be more fully explained hereinafter.

In the drawings:

Fig. 1 is a view partly sectional and partly elevational showing the apparatus connected with a worm and sector type of steering gear and mounted on the chassis.

Fig. 2 is a longitudinal section through the valve and the follow-up member (here the cylinder).

Fig. 3 is a section through the cylinder with the valve located and taken in a plane 90° removed from a plane section of Fig. 2.

Fig. 4 is an elevation of the valve.

Fig. 5 is a view of the parts, showing the valve displaced (exaggerated) from its neutral position.

Fig. 6 is a sectional view of my preferred construction.

Fig. 7 is an elevational view of the same.

Fig. 8 is a sectional view taken on line 8—8 of Fig. 6.

$a$ represents a piston which is secured by the piston rod through the universal joint $c$ to the chassis frame. The piston reciprocates in a piston chamber formed by the cylinder $d$. A valve housing in the form of a casting may be secured on to the cylinder as shown in Fig. 5 or formed integrally therewith as shown in Fig. 6. This casting has an intake port $e$ which is connected with a source of liquid under pressure preferably a pump 20. A relief valve 22 may be positioned between the pump and the inlet opening $e$ of the valve housing and may be set to determine the maximum pressure that may be built up, ordinarily between 400 and 600 pounds per square inch depending upon the vehicle with which the apparatus is used. The effective pressure, when the control valve is in neutral position, is preferably approximately 50 pounds per square inch and the pump may handle, say 6 gallons per minute. The outlet port is designated $j$ and leads to a suitable oil reservoir by means of the pipe 21.

The units shown in Figs. 5 and 6 are similar in general arrangement and differ only in structural details. Inside of the housing is located a cylindrical valve chamber in which slides the valve $f$ which has longitudinal grooves 26 in its periphery which do not extend the entire length of the valve. This valve is in the form of a cylinder and in the embodiment shown in Figs. 2 and 5 is closed at one end except for ports $k$. The valve $f$ connects by a valve stem $y$ with an actuating slide 23 contained in the casing 24 which screw tightly on to a threaded projection from the valve casing, in the form shown in Fig. 5, or bolts to the casing in the form shown in Fig. 6.

The valve casing has a central annular recess 25 and an annular recess at the right designated $h$ and one at the left designated $h'$. $h$ communicates with a port and a pipe 2 that in turn connects with the right end of the power cylinder $d$. The annular recess $h'$ communicates by the by-pass $i$ with the left end of the cylinder $d$.

$s$ is the steering arm which is rigidly connected with the steering sector $r$ by means of a squared shaft. The teeth of the steering sector mesh with the worm on the steering post but there is considerable play as is always the case where a worm meshes with a worm gear. The amount of this play will, of course, be multiplied at the ball $t$ on the other end of the arm. This ball, instead of being connected to the usual drag link, is connected by suitable bearing blocks and the take up spring $z$ with the slide which in turn connects with the valve stem $y$. In Fig. 5, the slide 23 is shown as having conical sockets or detent seats $w$ in which engage the detents $x$, which are spring-pressed into place; and in Fig. 6 a centering spring 29 and discs 32 and 33 are shown positioned between the slide 23 and the valve $f$.

The fluid under considerable pressure, say 50 pounds, enters the valve housing through the port $e$ and passes into the central annular recess 25, thence into longitudinal grooves 26 of the valve. These grooves terminate short of the ends of the valve cylinder, forming lands or rings $g$. These lands are very accurately related to the annular grooves $h$ and $h'$ when in neutral position. The grooves and the lands are machined so that each groove is only approximately ten thousandths wider than the land or ring, leaving a clearance of five one thousandths on each side. With the valve in neutral position, as shown in Figure 2, the liquid passes through these five one thousandths inch ports around the lands or rings to either side of the valve and to either end of the piston through the by-pass $i$ and the pipe 2. The liquid pressure on the piston keeps the same in a state of equilibrium. The valve housing is connected by means of another housing that forms a drag link 3 to the steered wheels. The valve in this neutral or central position with respect to the valve housing, gives the steered wheels "directional stability". That is, the power of the fluid, some 50 pounds per square inch, is acting to keep the wheels directly in the line that has been prescribed for them by the position of the steering wheel $o$. Now if anything like a rock, rut or a collapsed tire tends to move the drag link and the valve housing, with respect to the valve, then this is immediately resisted by the full power of the liquid and with a pressure that quickly builds up from the normal pressure. The shock tends to open up the valve openings on one side of the piston and this brings about an immediate differential pressure that tends to throw the drag link and the valve housing back to neutral position and correct the direction of the wheels so as to give the directional stability that we have referred to. The shock is not appreciably felt by the hands. I have made the discovery that contrary to what would be the general belief this shock absorbed in the steering apparatus does not injure the mechanism as would be the case if there were a solid mechanical lock so as to make the steering apparatus irreversible. What actually happens is the drag link and valve casing do move to a limited extent, thus relieving the shock and cushioning the impact but quickly they are restored so there is no real alteration of the direction of the vehicle. If the obstruction becomes more than a temporary one, then what happens, is the pressure builds up until the relief valve opens and limits the pressure on the feed line.

Returning now to the description of the parts, $m$ is a by-pass and $n$ a check valve that guards it. This check valve is ordinarily held closed by the pressure of the feed line, but if for any reason the liquid feed fails, then it is necessary for the slug of oil at either end of the piston to be displaced when the valve $f$ moves over to either end of the cylinder chamber in which the slide reciprocates about $\frac{1}{16}$ of an inch to pick up the follow-up member for emergency hand steering. Obviously when the oil has failed in the feed line, this check valve easily opens and lets out the oil behind either end of the piston. For instance, when (steering manually due to loss of power) the valve moves toward the left in Figure 2, the oil must be exhausted out of the cylinder $d$ at the right of the piston $a$ through the pipe 2 and the ports $k$ and the check valve $n$ and back to the other side of the piston. When the valve moves to the right and picks up the follow-up member the end of the slide 23 impacts the plug 27 and oil must be exhausted from the left of the piston which is through the passage $l$, the check valve $n$ and the by-pass $m$.

I come now to an explanation of the "poppets" $x$ or detents, shown in Fig. 5. These really do not appreciably interfere with the steering by power as they always easily give way when effort is used to move the valve $f$ by turning the steering wheel and they are so described in my prior application. They are not, properly speaking, centralizing means for when the steering effort has ceased, if the movement of the valve $f$ has also ceased, then the follow-up action will automatically centralize the apparatus due to the very small clearance between the grooves and the lands of the valve and valve seat. The power causes the follow-up member, here the valve casing, to move with respect to the valve, after the valve movement is stopped. Instantly that the follow-up member catches up with the valve, the equalization of the pressures centralizes the mechanism and keeps the valve in neutral position. But the valve will not always, in fact, usually will not stop, with the cessation of turning effort on the hand wheel $o$. By reason of the back lash in the system, due to the clearance between the worm and the sector teeth, magnified at the ball on the end of the steering arm, it is possible for the valve by the frictional drag or inertia of the follow-up member to make some quite appreciable movement after the hand steering wheel is held stationary. If the valve continues to make this movement permitted by the back-lash in the connections, then obviously the follow-up member and the drag link will carry on further than was desired, before they catch up and are stopped. Hence, my invention resides in part in the appreciation that some means of limited resistance should be interposed between the follow-up member on one hand, the valve and its connections on the other, so as to prevent the inertia and the friction between the valve and the housing in which it is contained from carrying on the valve within the permissible limits of the back-lash. That very limited resistance is afforded by the poppets or the detents.

Now referring to Figure 5, it will be seen that after the steering effort has ceased, the only thing that tends to keep the detents displaced as shown in this figure, is the tendency of the valve and its connection to over-carry within the permissible limits of the back-lash due to the gear and worm clearance at $p$. Obviously, if these springs are only a little stronger than this tendency to overcarry then these detents will hold the valve and its connection and allow the valve or follow-up member to immediately catch up and cut off the steering movement. If strong, stiff springs such as are sufficient to mechanically move the steering gear under ordinary steering conditions are used, for combined hand and power steering, then a different action takes place, for unless the hand wheel is held firmly, the centralization takes place partially by reversing the wheel in the operator's hands and then to get the desired position of the valve and direction he is obliged again to turn it back, or, if the driver would avoid this, then he must keep on resisting the heavy spring when he has ceased to turn the wheel until such time as the fluid pressure has done all of the centralization.

I find that a spring that exerts anywhere from 2 to 10 pounds will interpose sufficient retardation to the valve and its connections to prevent it being dragged along by the follow-up member or moved inertia of the parts. The strength of the spring will depend upon the particular apparatus and the frictional drag of the parts. A spring that is intended to do the steering mechanically under ordinary conditions, will on a large car have to exert a pressure of at least 75 pounds, probably considerable more. It will, therefore, be obvious that one in steering with combined mechanical and power connections will be obliged to substantially continuously exert the normal steering effort even in effecting power steering when abnormal resistance is met with. Here the power operates simply on the "booster" principle. Even to hold a position once taken by the valve of this combined steering system, effort must be exercised on the hand steering wheel to resist the strong recoil of the spring when the steering effort ceases. In my apparatus the spring can be made so light that this effort will not be felt and the power steering is at all times hard without any overthrow due to back-lash. None of the disadvantages and discomforts of shifting or jerking from power to hand steering or vice versa are experienced, and the apparatus is completely irreversible so far as road shocks being communicated to the hand wheel.

In the apparatus shown in Figures 6 and 7, the same principle of operation is obtained but here a double acting single spring 29 is used to take the place of the detents, and cooperates with the perforated discs 30 and 31. If cessation of the turning effort occurs, (suppose the valve is advanced to the right of the neutral position), the disc 30 at the left will have compressed the spring 29 against the disc 31 which engages a shoulder 32 of the valve casing. Any effort of the valve casing to drag the valve along after actuation of the valve has ceased will be resisted by this spring, which is of just sufficient strength to counteract the drag or friction and prevent overthrow and tend to keep the sector teeth up against the side of the worm which has been actuating. With such a light spring, obviously this will be insufficient to constitute any annoyance even if the worm and gear teeth do not engage in exactly an irreversible relation. The spring is of so little power, it is wholly insufficient to communicate any reversing effort to the hand wheel even though the worm and gear segment do have the same gear relation now normal in steering gears, that is, one in which the steering apparatus is reversible under most road shocks.

After the valve is moved to the left of the neutral position, the disc 31 picks up the spring 29 and drives the disc 30 against the shoulder 33. The small power of the spring will then resist any tendency of the follow-up member to drag the valve along after the turning effort has ceased. In each of these cases the effort of the spring is so small that it is insufficient to reverse the steering wheel. Consequently no reverse effort is felt by the hands and no centralization is due to spring pressure for the spring pressure is insufficient to overcome the friction offered by the worm and the worm gear in an attempt to reverse these. The result is that the valve stays "put" and is not partially returned to centralized position by the spring action and partially by the fluid action as is the case with the strong spring used in combined hand and power steering.

In the modification shown in Figures 6 and 7, the opposite ends of the valve $f$ are in communication through a passageway 34 which connects the annular chambers 35 and 36 in the valve housing instead of through the valve and ports $k$ as in Figure 5. The passageway 34 connects with the outer passage $j$ as best shown in dotted lines in Figure 7.

With narrow ports, it would be wholly impossible to steer manually by means of stiff springs which would not deflect, due to the great resistance of the passing of oil from one side of the piston to the other. It therefore follows, that if it is desirable to steer manually before the power comes into play, it is necessary to have the port openings wide enough when the valve is in neutral position to permit free flow of the oil from one side of the piston to the other. This is necessary to prevent the drag of moving the oil from one side of the piston to the other, adding an appreciable and undesirable amount of resistance to the normal steering. I have discovered that where it is desired to steer wholly by power the valve opening may be relatively narrow so that a very small displacement of the valve in relation to the valve ports is required to actuate the apparatus. In fact normally a displacement of one or two thousandths of an inch is sufficient to cause the necessary steering action. Another thing: If these strong springs heretofore proposed for combined power and hand steering were used in my apparatus, the apparatus would be entirely inoperative to steer manually because the fluid could not be by-passed from one side of the piston to the other with sufficient facility. On the other hand, one could steer by power with stiff springs but with unnecessary resistance as the springs must be sufficiently strong to do hand steering and also with the objections we have also referred to that the springs are sufficiently strong to communicate road shocks to the wheel. If a relatively light spring such as I employ were used with such wide ports as are employed in the proposed combined power and hand steering apparatus of the prior art, then there would be too great a movement required on the part of the valve to effect the power steering for the required accuracy of the steering control to obtain a safe steering action. In other words, the lost motion between the steering wheel and the road wheels would be great enough to give an unstable and unsatisfactory action. The reason for this is that with narrow port openings such as I employ, five thousandths a movement of say one one-thousandth of an inch either way cuts off approximately one fifth of the flow on the one side and augments the flow on the other side of the piston one fifth. On the other hand, with a valve opening of sufficient width to allow free passage of oil in manual steering, say one thirty second of an inch, or approximately thirty-two thousandths, a movement of one one thousandth of an inch is insufficient to appreciably change the pressure differential at least sufficient to start the piston moving. The reason is that in order to get the same pressure differential one has to get substantially the same restrictions which means a movement of twenty-eight thousandths of an inch. In other words, in order to get hydraulic power action it is necessary to build up a pressure on one side and this is done by restricting the flow of the oil through the orifice and until the orifice has been restricted to substantially the width that we have named, the necessary pressure is not built up to do the work.

In combined hand and power steering, in turning a curve at high speed, there is a tendency for the car to bounce up and down due to the unevenness of the road. This works on the self-righting arranged wheels in such a way as to alternately bring into effect the hand and the power steering giving very jerky unstable results, especially due to the fact that there must be such play in the power steering apparatus as already pointed out.

It will be understood that the operative position of the valve $f$ in Figure 5 is exaggerated, as in actual normal practice the lands $g$ will not contact with or overrun the ports $h$, $h'$; the narrow ports setting up sufficient resistance before contact between the land and ports.

It is quite important that the structural parts controlling the exact distance between the recesses $w$ and the lands $g$ and ports $h$ in the structure shown in Figs. 2 and 5, or the valve, valve housing and shoulders 32 and 33, in the structure shown in Figure 6, be very accurate, the parts controlling these distances having ground surfaces. To be sure that the valve is absolutely centered when in normal position, the unit itself is set up and oil run through in the regular manner, if there is the slightest movement of the piston when the oil flows through, then one or more of the surfaces controlling the exact center of the valve is ground away one way or the other until the piston is absolutely motionless when oil is conducted through the valve and valve housing.

The spring $z$ has two functions, the first is that it is a take-up spring to hold the block against the ball on the end of the steering arm and the second is that it is a relatively strong spring that ordinarily makes the connection between the steering arm and the cylinder a rigid one, but it can yield under unusual strains to prevent the strain being communicated to the worm and worm gear so as to break the steering apparatus.

What I claim is:

1. Power steering gear for vehicles, comprising a hand operable steering post, dirigible wheels, motion translating means operable by the steering post through a connection having back lash, a cylinder and piston movable relative to each other, one connected to the steered dirigible wheels and the other stationarily connected to the vehicle and said piston being imperforate, said cylinder having passageways leading to opposite ends of the piston, a valve housing rigidly connected and movable with the movable member of the cylinder and piston construction and having liquid supply and outlet passageways, a valve connected to and movable in unison with said motion translating means and functioning within said valve housing in combination with said passages and passageways to distribute the liquid equally and under pressure to opposite sides of the piston when the valve is in neutral position and instantly serving to disturb said equilibrium and cause power actuation relative movement of said piston and cylinder when actuated by said motion translating means, and relatively light yielding retarding means effective upon said valve and valve housing to permit the valve housing to catch up and assume neutral position relative to the valve when hand steering effort on the valve has ceased, the retarding effort being coordinated with the drag that the valve housing would otherwise have on the valve so as to just nullify this drag and prevent overthrow of the dirigible wheels after the hand steering effort has ceased, and coordinating with the steering load so as to never permit movement of the dirigible wheels by hand power before the said valve is moved to permit power steering, said clearance between the corresponding passageways in the valve and valve housing when the valve is in neutral position being relatively small and the valve being movable less than five thousandths of an inch to cause said equilibrium disturbance and power actuation.

2. Power steering gear for vehicles, comprising a hand operable steering post, dirigible wheels, motion translating means operable by the steering post through a connection having back lash, a cylinder and piston movable relative to each other, one connected to the steered dirigible wheels and the other stationarily connected to the vehicle, said cylinder having passageways leading to opposite ends of the piston, a valve housing rigidly connected and movable with the movable member of the cylinder and piston construction and having liquid supply and outlet passageways, a valve connected to and movable in unison with said motion translating means and functioning within said valve housing in combination with said passages and passageways to distribute the liquid equally and under pressure to opposite sides of the piston when the valve is in neutral position and instantly serving to disturb said equilibrium and cause power actuation relative movement of said piston and cylinder when actuated by said motion translating means, and yielding retarding means effective upon said valve and valve housing to permit the valve housing to catch up and assume neutral position relative to the valve when hand steering effort on the valve has ceased, the retarding effort being coordinated with the drag that the valve housing would otherwise have on the valve so as to nullify this drag and prevent overthrow of the dirigible wheels after the hand steering effort has ceased, and coordinating with the steering load so as to never permit movement of the dirigible wheels by hand power before the said valve is moved to permit power steering, said yielding retarding means being relatively light and just sufficient to overcome the drag between the valve and valve housing, said clearance between the corresponding passageways in the valve and valve housing when the valve is in neutral position being relatively small and the valve being movable less than five thousandths of an inch to cause said equilibrium disturbance and power actuation.

3. Hydraulic steering mechanism comprising, a main control member including a back lash connection, a steered part, piston and cylinder elements one of which is relatively movable and directly connected to the steered part and said piston being imperforate, valve mechanism including a movable valve and a housing having cooperating ports, said valve and housing while in relative neutral position admitting liquid under pressure through connecting conduits acting positively on both sides of said piston and movable from neutral position to admit liquid to one side or the other from said piston and exhausting the liquid from the contrary side of the piston to cause relative movement between the piston and cylinder to operate the steered part, said valve housing being directly connected to the movable elements (piston and cylinder) and the movable valve being directly connected through said back lash connections to said main control member, means spaced from said valve mechanism and comprising one part connected to and accurately positioned a predetermined distance from the ports of said movable valve, and the other part directly connected to and accurately positioned a predetermined distance from the ports of said valve housing, resilient means forming a part of said last named means for permitting said two parts to separate immediately upon movement of the main control member and movable valve and effective upon said separated parts to retard the valve and permit the valve housing to catch up and assume neutral position relative to the valve when the movement of thhe main control member has ceased, the retarding effect being coordinated with the drag that the valve housing would otherwise have on the valve so as to nullify this drag and prevent overthrow of the steered part after movement of the main control member has ceased, and coordinating with the steered load so as to never permit movement of the steered part by hand power before the valve is moved to permit power steering, said resilient retarding means being relatively light and just sufficient to overcome the drag between the valve and valve housing.

4. Hydraulic steering mechanism comprising, a main control member including a back lash connection, a steered part, piston and cylinder elements one of which is relatively movable and directly connected to the steered part, valve mechanism including a movable valve and a housing having cooperating ports, said valve and housing while in relative neutral position admitting liquid under pressure through connecting conduits acting positively on both sides of said piston and movable from neutral position to admit liquid to one side or the other from said piston and exhausting the liquid from the contrary side of the piston to cause relative movement between the piston and cylinder to operate the steered part, said valve housing being directly connected to the movable elements (piston and cylinder) and the movable valve being directly connected through said back lash connections to said main control member, means spaced from said valve mechanism and comprising one part connected to and accurately positioned a predetermined distance from the ports of said movable valve, and the other part directly connected to and accurately positioned a predetermined distance from the ports of said valve housing, resilient means forming a part of said last named means for permitting said two parts to separate immediately upon movement of the main control member and movable valve and effective upon said separated parts to retard the valve and permit the valve housing to catch up and assume neutral position relative to the valve when the movement of the main control member has ceased, the retarding effect being coordinated with the drag that the valve housing would otherwise have on the valve so as to nullify this drag and prevent overthrow of the steered part after movement of the main control member has ceased, and coordinating with the steered load so as to never permit movement of the steered part by hand power before the valve is moved to permit power steering, said resilient retarding means being relatively light and just sufficient to overcome the drag between the valve and valve housing, said clearance between the corresponding passageways in the valve and valve housing when the valve is in neutral position being relatively small and the valve being movable less than five thousandths of an inch to cause said relative movement.

5. In a liquid actuating device for steering gear, a stationarily anchored imperforate piston and rod, a movable cylinder circling the piston and piston rod, means to be actuated directly connected to said movable cylinder, a follow-up valve unit comprising a ported valve casing formed by an extension of said cylinder and a movable valve provided with complemental ports, a main control member directly connected to said movable valve through a lost motion connection, passageways connecting said follow-up valve casing with opposite ends of said cylinder, means for supplying a continuous flow of liquid to said valve unit, said movable valve and seat when in central position directing a portion of the liquid under pressure equally and positively to both ends of the cylinder but movable to admit liquid to one side or the other of the piston and exhaust liquid from the contrary side of the piston to cause relative movement of the cylinder and actuation of the means to be actuated, liquid constantly under pressure on both sides of the piston controlling at all times the relative position of the means to be actuated, and a retarding device comprising two complemental fitting relatively movable parts rigidly connected to and adapted to normally align the valve and seat in central position, relatively light resilient means permitting said parts to immediately separate upon actuation of said control member and its directly connected movable valve, but retarding said valve and bringing said parts into complemental relationship immediately after stoppage of said control member, said device causing external shocks on the means to be actuated to be absorbed at all times by the liquid under pressure on both sides of the piston.

6. In a liquid actuating device for steering gear and similar apparatus, the combination of relatively movable piston and cylinder elements, one of said elements being fixed and said piston being imperforate, said movable element forming the seat of a follow-up valve unit, a movable valve forming the other part of said follow-up valve unit, said valve and seat having cooperating ports, said ports fitting very closely and having relatively small clearance and continuously directing liquid under pressure equally and positively to both sides of said piston when said valve and seat are in central position, and applying the liquid differentially to opposite sides of said piston when said movable valve is moved one way or the other relative to the valve seat, a main control member connected to said movable valve through a back lash connection, operating connection between the control member and valve being solid to effect unitary movement therebetween, means directly connecting said movable element with the means to be actuated, the liquid constantly under pressure on both sides of the piston controlling at all times the relative position of the means to be actuated, and a retarding device for preventing overthrow of the movable valve comprising relatively movable elements adapted to be positively aligned when the valve and seat are in central position, one of the elements of said retarding device being directly connected to the movable valve and the other element of said retarding device being directly connected to the valve seat, means for continuously supplying liquid under pressure to the follow-up unit, a lost motion connection between said movable valve and the valve seat permitting positive contact between the valve parts and manual actuation of the means to be actuated by the main control member only upon failure of the liquid supply, and means for bypassing the liquid in the event of failure of liquid supply and manual actuation.

7. In a liquid actuating device for steering gear and similar apparatus, the combination of a piston and cylinder, valve mechanism including a movable valve and seat having cooperating ports, said seat having passageways connecting the same to the cylinder, said movable valve being normally held in central position relative to its seat and said cooperating ports having clearance whereby to continuously admit liquid under pressure to both sides of said piston and movable from central position to admit liquid to one side or the other side of said piston and exhausting the liquid from the contrary side to cause a relative movement between the piston and cylinder, said clearance between the corresponding passageways in the valve and valve seat when the valve is in neutral position being relatively small and the valve being movable less than five thousandths of an inch to cause equilibrium disturbance and power actuation, means to be actuated connected to the movable element of said piston and cylinder construction, the liquid constantly under pressure on both sides of the piston controlling at all times the relative position of the means to be actuated, a main control member connected to directly operate said movable valve, the valve seat being rigidly connected to said movable element whereby actuation of either the control member or the movable element will cause relative movement of the two parts, and a positive acting retarding device for said movable valve relative to the seat comprising a connection rigidly connected to one of said valve parts and having a depression formed in it, and a relatively light spring detent device formed in a member rigidly secured to the other part of said valve, said depression and spring detent being so arranged as to solidly contact when said valve parts are in central pressure equalizing position.

8. In a liquid actuating device for steering gear and similar apparatus, the combination of a piston and cylinder, valve mechanism including a movable valve and seat having cooperating ports, said seat having passageways connecting the same to the cylinder, said movable valve being normally held in central position relative to its seat and said cooperating ports having clearance whereby to continuously admit liquid under pressure to both sides of said piston and movable from central position to admit liquid to one side or the other side of said piston and exhausting the liquid from the contrary side to cause a relative movement between the piston and cylinder, said clearance between the corresponding passageways in the valve and valve seat when the valve is in neutral position being relatively small and the valve being movable less than five thousandths of an inch to cause equilibrium disturbance and power actuation, means to be actuated connected to the movable element of said piston and cylinder construction, the liquid constantly under pressure on both sides of the piston controlling at all times the relative position of the means to be actuated, a main control member connected to directly operate said movable valve, the valve seat being rigidly connected to said movable element whereby actuation of either the control member or the movable element will cause relative movement of the two parts, and a positive acting retarding device for said movable valve relative to the seat comprising one part connected to and accurately positioned a predetermined distance from the ports of the movable valve and the other part directly connected to and accurately positioned a predetermined distance from the ports of said valve seat, and relatively light yielding means cooperating with said two parts of said retarding device for permitting said two parts to separate immediately upon movement of the main control member and movable valve and effective upon said separated parts to retard the valve and permit the valve housing to catch up and assume neutral position relative to the valve when the movement of the main control member has ceased, said yielding retarding means being relatively light and just sufficient to overcome the drag between the valve and valve housing.

HARRY F. VICKERS.